Nov. 4, 1969         W. WILKE ETAL         3,475,894
PRODUCTION OF STRANDS FROM FIBROUS MATERIAL, PARTICULARLY
                    ASBESTOS FIBERS
Filed Oct. 23, 1967                    6 Sheets-Sheet 1

Nov. 4, 1969     W. WILKE ETAL     3,475,894
FIG. 9     FIG. 10     FIG. 12     FIG. 11
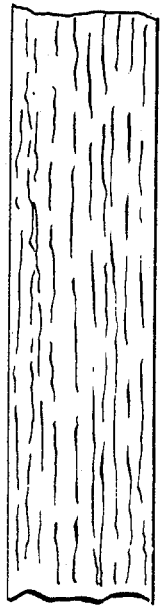
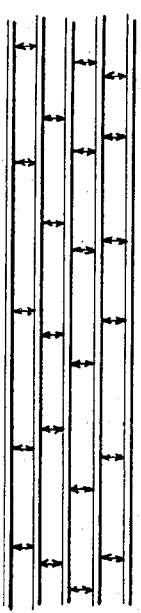
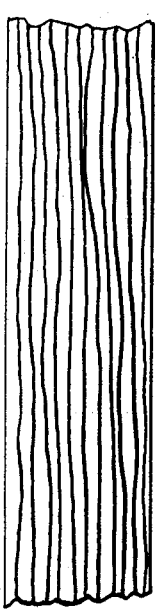
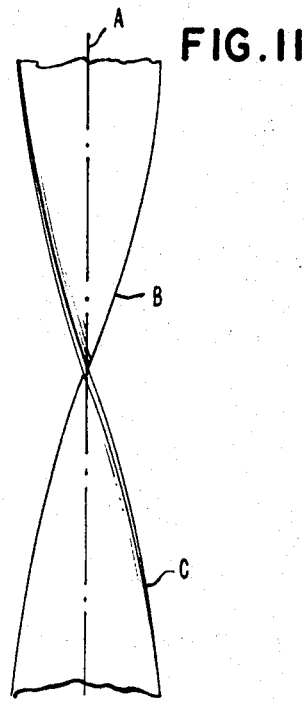
FIG. 14
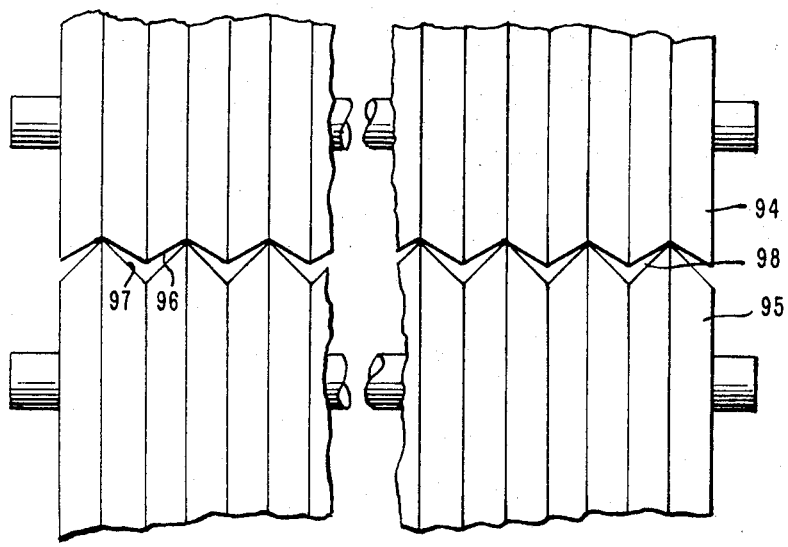

United States Patent Office 3,475,894
Patented Nov. 4, 1969

3,475,894
PRODUCTION OF STRANDS FROM FIBROUS MATERIAL, PARTICULARLY ASBESTOS FIBERS
Werner Wilke and Hans Fetzer, Schwabisch Hall, Germany, assignors to Rex Asbestwerke Graf von Rex K.G., Schwabisch Hall, Germany, a corporation of Germany
Continuation-in-part of application Ser. No. 635,561, May 2, 1967. This application Oct. 23, 1967, Ser. No. 681,050
Claims priority, application Austria, May 3, 1966, A 4,176/66; Dec. 23, 1966, A 11,853/66
Int. Cl. D01h 7/00, 13/30; D02g 3/20
U.S. Cl. 57—58.89                      21 Claims

ABSTRACT OF THE DISCLOSURE

Yarn and other strand material is produced from a dispersion of asbestos or other short fibers by having a travelling band of dispersion contacted by a coagulant-coated surface of a cylinder or other moving structure which conveys the band away from, or out of, a nozzle. The nozzle may be formed of rotating cylinders which simultaneously serve as conveying structures. Preferably, the nozzle cylinders are serrated and intermesh to form between each other a multitude of orifices so that a multi-filament band is issued. For the production of yarn, the band, when coagulated, is twisted during continuance of its forming travel.

---

This is a continuation-in-part of our application Ser. No. 635,561, filed May 2, 1967, now abandoned.

Our invention relates to the production of strands from dispersions of fibers and more particularly, though not exclusively, to the production of twisted strands of yarn from asbestos by continuously passing a dispersion of fibers in a liquid containing a dispersing agent through a nozzle and subjecting the dispersion issuing from the nozzle to the action of a coagulating or precipitating agent so that a solidified strand is formed.

Such production methods are known. For instance, the German Patent 1,168,012 describes a method in which the strand of dispersion emerging from the nozzle is passed into a precipitating bath where the coagulation takes place. The coagulation, however, can be carried out in a different manner. For instance, a protein-based dispersion agent can be used, and the nozzle or a part of the apparatus with which the strand comes into contact after leaving the nozzle, is arranged to heat the dispersion as it is being formed or after its formation.

This known method has considerable advantages over the dry spinning process previously practiced. In particular, the method affords the production of strands from comparatively short fibers and consequently is especially suitable for asbestos, since in this case it is often desired to form thread and other structures whose properties are dependent on the fiber length. Known devices allow the production of very thin threads or yarns at a high speed. The fibrous strands produced can be twisted or spun into multi-filament structures, or can be worked in another manner as required by the intended use.

Although the known method is particularly advantageous for the processing of asbestos fibers, it is also applicable to other fiber materials, such as to mixtures of fibers containing asbestos.

The known method, however, leaves much to be desired in various respects. Thus, with the known method, no more than a comparatively coarse regulation of yarn fineness can be achieved. Furthermore, only rather thin fiber strands can be produced, as otherwise the coagulation in the bath is incomplete.

It is an object of the present invention to improve the known production method so as to remove the disadvantages just mentioned.

Another, more specific object of the invention is to provide for continuity of production from the supply of fiber dispersion up to the emergence of twisted yarn, while securing complete and uniform coagulation throughout the yarn body.

A further object of the invention, subsidiary to those mentioned and particularly referring to the production of yarn from asbestos fibers or mixtures predominantly containing asbestos fibers, is to afford a precise control or regulation of the strand or yarn thickness.

Still another object of our invention is to secure utmost uniformity of travel of the material from the dispensation of the fibrous dispersion up to complete coagulation, spinning and deposition of the resulting yarn, thus also securing a product of improved qualitative uniformity.

An object of our invention also is to expedite the coagulation of the dispensed fiber dispersion and thereby shortening the travel distance and travel time of the material from the dispensing locality of the dispersion to the point of completion of the yarn, thus providing for improved economy of manufacture as well as for small space requirements of the processing machinery required.

A further object of the invention is to provide for increased surface area of the strand to be coagulated and for augmented wetting of the strand by a coagulating agent in order to further contribute to shortening of the length and time of travel with the aim of reducing the space requirements and time involved in the manufacture of asbestos products, as well as improving the quality of such products.

To achieve these objects, and in accordance with a feature of our invention, an aqueous dispersion of fibrous material, preferably formed of short asbestos fibers or the like, is shaped by the nozzle to a strand whose cross section is elongated, and the shaped dispersion product is conveyed away from the nozzle outlet by a moving surface of a body covered with the coagulating agent so that the coagulation is initiated on that surface. Thereafter we separate the at least partially solidified strand from the body surface and, after solidification of the band, subject it to twisting and convert the strand to yarn.

According to another feature of our invention, we pass a suspension of fiber material through a shaping nozzle formed of two or more rotating structures, such as rollers, which form a nozzle gap between each other and have a direction of rotation corresponding to the dispensing direction at the gap; and we give the nozzle gap an elongated shape, or a cross section having elongated parts, such as in a star shape, to produce a correspondingly shaped strand.

Regardless of whether the strand leaving the nozzle is a flat strip or has a cross section with several elongated parts, as is the case with a star shape, it will be realized that by virtue of the portion of this cross section being elongated, the total cross-sectional area of the strand can be made large without the coagulating agent having to pass through a great thickness of strand material in order to effect a substantially complete solidification of the strand.

The width of the nozzle passage is preferably adjustable. Since the travel speed of the conveying body surface, for example that of a rotating cylinder, is also adjustable, the thickness of the strand can be varied and precisely adjusted or regulated. Since, further, a substantial amount of solidification takes place while the strand is in contact with the moving body surface the strand can be easily removed from the surface for further treatment.

The strand leaving the nozzle and entering with its flat or elongated side into contact with the surface of the conveying body, becomes subjected at this inner strand side to the amount of coagulating liquid located on the conveying surface. It is preferable to make certain that the other, outer side of the strand be also brought in contact with coagulating agent for securing a particularly rapid and complete solidification. This is achieved, together with a simple way of coating or wetting the moving surface of the conveying body, by having a conveying surface dip into a bath of the coagulating agent. However, the coagulating agent may also be supplied to the conveying surface of the body by other means, such as by spraying.

The subsequent separation of the strand from the conveying surface is facilitated, for instance by using jets of air or water. Similarly, the outer surface of the strand can also be wetted with coagulating agent by spraying or sprinkling instead of dipping.

According to still another feature of our invention, at least part of the nozzle wall forms part of the above-mentioned carrier body, the direction of movement of the carrier-body surface substantially coinciding, when in operation, with the travel direction of the dispersion from the supply toward the nozzle outlet. With this arrangement, the moving wall part constantly urges the fiber dispersion through the nozzle outlet so that blockages are avoided. Preferably more than one such carrier body is provided, and the carrier bodies used are arranged to form the greater part of the nozzle structure. This permits giving the nozzle passage a comparatively large cross-sectional area, though the minimum distance between any two opposite wall parts of the nozzle can be kept very small without danger of blocking the gap between oppositely placed moving wall parts.

Preferably the direction of movement of the one or more carrier bodies at the outlet of the nozzle is downward and hence in the same direction as the force of gravity. With such an arrangement the emerging strand moves downward and can be passed directly into a coagulating bath.

An advantage of such apparatus is that the one or more carrier bodies can be arranged to apply coagulating agent to the strand as it is being formed in the nozzle or to the strand after it has left the nozzle. Alternatively, the carrier body or bodies can be arranged to effect coagulation of the strand by another method, for instance by heating it. Using a nozzle construction that causes the strand emerging from it to be completely or partly coagulated offers the advantage that the strand can be immediately subjected to further treatment, such as twisting, without the use of furher coagulating means such as a bath. Preferably the cross section of the nozzle passage is in the form of a single slit whose sides are defined by two carrier bodies, for instance rotating rollers or drums. Such a nozzle is particularly simple in construction. The slit-like nozzle passage allows the production of fibrous strand in the form of a long thin band. It also has the advantage that, by suitably choosing the length and width of the nozzle slit, a paper-like strand, such as asbestos paper, can be produced. Other forms of nozzle cross section are also applicable. For example, the nozzle cross section can be formed by four carrier bodies in the form of rollers with V-shaped generatrices projecting away from the axes of the respective rollers. The surfaces of the rollers with such generatrices then fit together to leave a narrow nozzle passage in the form of a star with four pointed arms. The strand issuing from the nozzle therefore has a corresponding cross section, and the arms constitute the elongated parts of the cross section. Other forms of strand cross section are likewise suitable. For instance, a tubular strand is produced by a nozzle formed of two rollers having peripheral grooves of semi-circular cross section. The rollers are placed in contact so that the grooves cooperate in forming a nozzle passage of circular cross section, a mandril being placed between the rollers so that a tubular strand is produced. In such a construction provision must be made for supplying sufficient precipitating or coagulating agent through the inside of the mandril to the inside part of the fiber strand. Alternatively, the rollers and mandril can be so shaped as to slit the tubular strand longitudinally.

In this construction, the carrier bodies are best made in the form of rollers which are cylindrical apart from the grooves. Such a construction is particularly simple. Among other applicable arrangements are, for instance, carrier bodies in the form of moving belts trained about a pair of rollers or pulleys.

In apparatus with carrier bodies that dip into a bath of coagulating agent, at least the surfaces of these bodies are to be formed of material which is wettable by the agent. Means can be provided for continuously wetting the surfaces of the bodies. This offers the advantage that the fibrous strand produced will readily detach itself from the body and that the carrier bodies entrain the precipitating bath liquid in a controllable manner and the coagulating liquid comes into contact with the fiber dispersion before it emerges from the nozzle. If two such carrier bodies in the form of rollers are used, the nozzle passage will be cusp-shaped in a section normal to the axes of the roller. Having the carrier bodies constantly dip into the coagulating agent provides a simple construction and secures optimum wetting of the strand.

In a preferred embodiment of the invention, the nozzle has a slit-like cross section and is adjacent to a carrier body in the form of a cylindrical roller or drum, the nozzle slit extending along the roller parallel to its axis of rotation. This axis, for utilizing gravity in the operation of the apparatus, preferably extends in a substantially horizontal direction, the nozzle slit being located at an upper part of the surface of the body, preferably along its top.

For applying coagulating agent to the surface of such a carrier roller, a construction is preferred in which the bottom portion of the roller dips into a bath of the agent held in a container, and a transport member, preferably also in the form of a roller, is provided over which the solidified strand coming from the carrier roller is passed on its way to the twisting means.

Preferably the carrier roller and the transport member are arranged for rotation about parallel axes and have between them a gap whose width is approximately equal to the thickness of the strand when solidified.

The transport roller can be arranged to remove the band-like strand from the carrier roller at a locality on the latter downstream from the locality where the rotating carrier surface enters into the coagulating bath. That is, the strand on the carrier body will pass through the bath before it is removed from the carrier and passes onto the transport member. This provides for extremely efficient wetting of the strand.

Tests have shown that the amount of coagulating agent passing through the band is sufficient for wetting the cylindrical or other conveying surface of the carrier body. If required, however, other wetting means may be provided, for instance a spray device which places further agent on the surface of the body at a locality ahead of, and adjacent to, the slit nozzle.

The separation of the fibrous band from the carrier body may also take place upstream from the locality where the carrier body passes into the bath of agent. Then, however, the carrier body must be relatively large to keep the dwell time of the strand on the conveying surface sufficiently long for satisfactory coagulation.

The removal of the band from the carrier body is easily ensured by arranging the carrier body and the transport member so that their surfaces which come nearest together move in the same direction and at the same peripheral speed. However, the transport member may also move at a higher peripheral speed than the carrier body. To facilitate detaching the fibrous band from the surface of the carrier body, the apparatus can be equipped with a slit nozzle for directing a jet of air or water between the strand and the carrier body at a position at which the strand passes from the latter to the transport member.

The material of the carrier body forming its surface should be readily wettable by the coagulating or precipitating agent. For example, the surface of the body may be formed by a layer of foam material such as polyurethane, having pores of about 1 mm. in size. The carrier surface may also be roughened or pitted for contacting the dispersion coming from the nozzle.

Like the carrier body, the transport member, though preferably designed as a cylinder, may also be formed of an endless belt.

In apparatus according to the invention in which the nozzle has a slit-like cross section and is located adjacent to the carrier body, the width of the nozzle slit can be made so narrow that the dispersion does not of its own accord emerge from the nozzle but is only drawn out through the nozzle slit by adhesion to the surface of the moving carrier body wetted with coagulating agent. Such dependence on the motion of the carrier body for causing dispersion to emerge from the nozzle is not necessarily required. The readiness of the dispersion to emerge can be increased by applying a hydrostatic pressure upstream of the slit nozzle. On the other hand, steps can be taken to hold the hydrostatic pressure at a low value in order to minimize the tendency of the dispersion to issue from the nozzle. In this manner the quantity of dispersion emerging from the slit nozzle can be varied additionally.

The apparatus in the form just described has the advantage that the twisting means can be in the form of a device which allows spinning to begin automatically. Coagulation of the fiber strand can proceed to such an extent on the carrier body that, when the strand leaves the body, the transport member can pass it directly into a spinning pot of the centrifugal type. The transport roller can be made of porous material, such as ceramics, and water can be supplied to its interior to pass radially outward through the pores for detaching the strand or yarn from the roller surface. The apparatus may be equipped with a funnel which receives the strand and leads it to a twisting device such as a spinning centrifuge, the funnel walls being continuously washed with water.

In accordance with another feature of the invention, the carrier body is a cylindrical drum which is journalled for rotation about its axis and is also rotatable about a second (twist) axis perpendicular to its own axis, the surface of the drum being porous and being sprayed or sprinkled with coagulating agent or supplied with it through an end bearing pin. With this apparatus the band-like strand is twisted as it leaves the carrier roller so that the latter and other parts of the apparatus also perform the function of a spinning device. A further advantage of such an embodiment of the invention lies in that the twisted strand can immediately be passed to a device for such subsequent treatment as subjecting the yarn to heating at a temperature sufficient to remove organic components of the dispersing and/or coagulating agents. Preferably the drum axis is horizontal and the twist axis vertical.

In accordance with further preferred features of the invention, the apparatus comprises guide means for the twisted strand leaving the carrier body along a path coinciding with the twist axis, the guide means being located at the carrier side remote from the nozzle. The spun fibrous strand passes from the carrier body to the guide means and away therefrom, the spinning taking place between the carrier body and the guide means. Preferably the nozzle passage is symmetrical to the twist axis, and the nozzle rotates about this axis.

It is generally advantageous for the purposes of the invention to provide for adjustment of the width and/or length of the nozzle slit. This allows not only for control of the width and length of the strand cross section, but also permits an adaptation to the viscosity of the dispersion or other factors affecting its fluidity. For example, if an especially thin strand is to be produced, the width of the slit of the nozzle should be made so small that the dispersion only passes through the nozzle when the adhesive traction of the carrier body comes into play by causing the carrier body surface to move past the nozzle orifice.

When considered in relation to prior art, yarns and threads of asbestos, as well as sheets and other asbestos structures, made in accordance with the invention have high tensile strength, low weight, and the advantage that they can be easily tied into knots.

The above-mentioned and other objects, advantages and features of our invention, said features being set forth with particularity in the claims annexed hereto, will be apparent from the following description of apparatus embodying the invention by way of example and illustrated on the accompanying drawings.

FIG. 1 is a diagrammatic and sectional view of a first embodiment; FIG. 2 is a diagrammatic perspective view of another embodiment; FIG. 3 is a partial section of the roller 6 shown in FIG. 1; FIG. 4 is a perspective and sectional view of the roller 20 shown in FIG. 2; and FIG. 5 is a partial section of a nozzle detail applicable in apparatus according to FIG. 1.

FIG. 6 shows in perspective another form of a nozzle.

FIG. 7 diagrammatically shows a third form of apparatus according to the invention in which a band is produced and spun; and FIG. 8 is a similar view of a fourth form of apparatus in accordance with the invention.

FIGS. 9 to 13 are explanatory diagrams relating to another mode of the method according to the invention, and FIG. 14 shows schematically part of a multi-filament nozzle suitable therefor.

Figure 1:
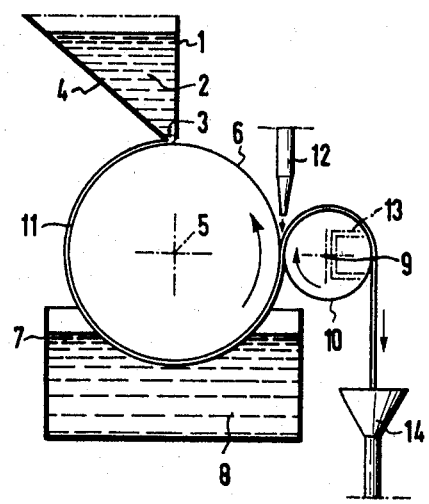

In the apparatus shown in FIG. 1, a band-shaped asbestos fiber strand is produced from a fiber dispersion and then spun. The fiber dispersion can be made up for example as follows:

| | Kg. |
|---|---|
| Asbestos fiber | 100 |
| Crystalline aluminum sulfate | 4 |
| Silastan DMK (equal parts of alkylbenzenesulfonate and a solvent, preferably water) | 3 |
| Technical quality hard soap | 33 |
| Water, 3300 liters. | |

Also suitable as wetting agent instead of Silastan DMK is sodiumdodecylbenzensulfonate, for example. A conveniently applicable coagulating agent for this dispersion is zinc sulfate solution containing 50 grams of crystalline zinc sulfate per liter of water.

Figure 5:
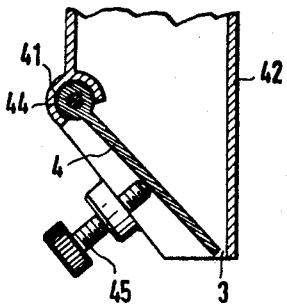

As shown in FIG. 1, the apparatus comprises a hopper-shaped dispenser tank 1 for supplying and dispensing the asbestos fiber dispersion 2. The bottom portion of the dispenser tapers downwardly (FIGS. 1 and 5) to form a narrow nozzle slit 3 whose width can be altered by angularly displacing a part 4 of the dispenser wall with the aid of a set screw 45. The wall part 4 has a pivot bearing 41 seated and sealed in a lined sleeve 44.

Figure 3:
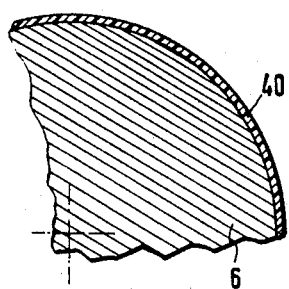

A carrier body in the form of a drum 6 rotates about its axis 5 which extends parallel and below the slit 3. The cylindrical surface of drum 6 is coated with a thin layer 40 of polyurethane foam material (FIG. 3). The drum 6 dips into a bath of precipitating or coagulating agent 8 held in a container 7 so that the asbestos fiber strand is continuously wetted by the agent 8. Located at the side of upward rotation of drum 6, namely at the right side in FIG. 1, there is a transporting or receiving roller 10 rotating about an axis 9 parallel to axis 5. The roller 10 removes the band-shaped strand solidified on the carrier drum 6. To facilitate detachment of the band 11, an air nozzle 12 is provided to direct an air jet into the gap between the drum surface and the solidified fiber band 11. As is indicated by broken lines, a water supply chest 13 is provided inside the roller 10 so that water under slight gauge pressure is forced through the porous material of the hollow roller 10 in an outward direction. This ensures a trouble-free detachment of the asbestos fiber band so that the latter runs down from the roller surface through a funnel 14 whose wall is kept covered with flowing water. From funnel 14 the band passes to a suitable spinning device.

As is apparent from the drawing, during operation of the apparatus, the carrier drum 6 rotating anti-clockwise becomes covered with a strand of dispersion. The arrangement may be such that the issuance of the dispersion from the nozzle depends upon the dragging effect of the drum 6. However, the issuance of dispersion from the nozzle may also be more or less caused by hydrostatic pressure, or by a combination of drag and hydrostatic pressure. When the dispersion comes into contact with the surface of drum 6, the latter is already moistened with precipitating agent which acts on the inner side of the band 11. As the band is passed into the coagulating agent 8 by the motion of the drum 6, the band also becomes subjected to solidifying action from its radially outer surface. When the band emerges again from the bath, it is substantially solidified and is entrained by the transport roller 10 rotating clockwise and simultaneously serving as a squeezing roller to remove superfluous coagulating agent from the band 11 before the band runs into the funnel 14.

Figure 6:
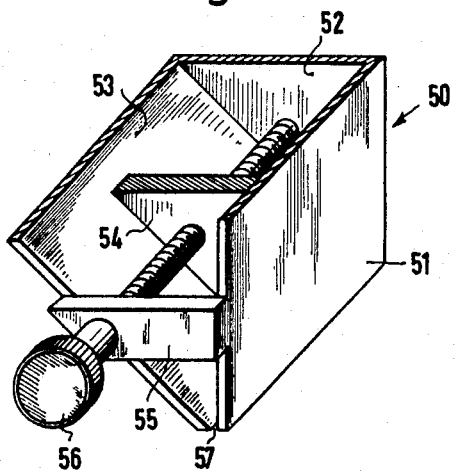

In the modified construction of the dispersing container 50 shown in FIG. 6, the length instead of the width of the nozzle slit 57 is adjustable. Three of the dispenser walls 51, 52 and 53 are fixed. The fourth wall 54 is slidably displaceable by turning a screw spindle 56 which is mounted in a cross piece 55 so that it can rotate but cannot move axially. The spindle 56 is screwed through a threaded hole in the wall 54.

Figure 2:
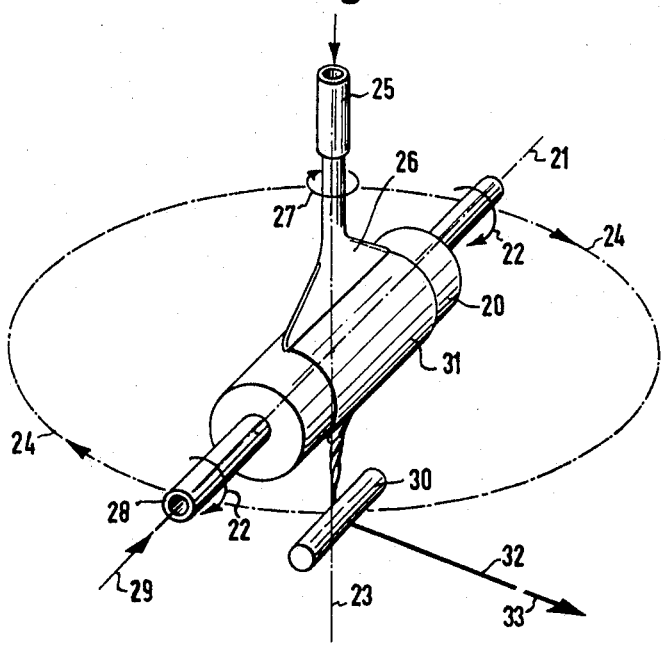
Figure 4:
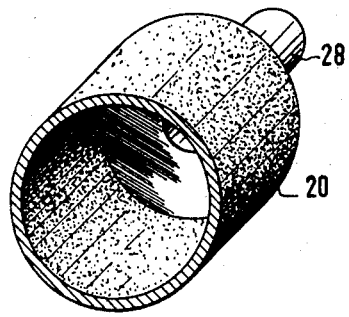

In the apparatus shown in FIG. 2 the carrier body is formed by a cylindrical drum 20 which, by means not shown, is mounted so that it can rotate about its own axis 21 in the direction of arrow 22 and can also rotate about a second axis 23 normal to axis 21. Rotation about axis 23 is indicated by arrow 24. A dispersion supply pipe 25 for the asbestos fiber dispersion is mounted above the drum 20. The lower end of pipe 25 is connected with a downwardly flaring nozzle 26 with an opening of slit-shaped cross section. The slit nozzle rotates, as indicated by arrow 27, together with the drum 20 about the second axis 23. As shown in FIG. 4, the drum 20 is hollow and has a porous casing wall which is permeable to the coagulating or precipitating agent and may be made, for example, of ceramic material. The agent is fed through the hollow drum shaft 28 as indicated by arrow 29 (FIG. 2). Under the pressure maintained in the drum, the agent is forced through the porous drum wall to emerge at its surface. A guide in the form of rod 30 is mounted below the drum 20.

In operation, the drum 20 rotates about the axis 21, and the whole system, with the exception of the supply pipe 25 and the guide rod 30, rotates about the second axis 23. When an asbestos fiber suspension is being supplied through pipe 25 and the guide rod 30, rotates about the second axis 23. When an asbestos fiber suspension is being supplied through pipe 25 and dispensed through the elongated slit nozzle 26 onto the surface of the drum 20, a band 31 of elongated cross section is drawn out of the nozzle. This band is wetted and solidified by the coagulating agent emerging through the drum surface. Below the drum 20 the asbestos fiber band 31 is drawn away from the drum by passing around the guide rod 30. Due to the simultaneous rotation of nozzle 26 and drum 20, the band is twisted so that a fully spun asbestos yarn or thread is drawn off at 32 in the direction of arrow 33. Any unsolidified amounts of the dispersion situated on the free surface of the asbestos fiber band 31 are coagulated during twisting, since it brings them into contact with other areas of the band surface wetted with coagulating agent.

The asbestos strand or yarn 32 can then be subjected to subsequent treatment in which, for example, volatile or vaporizable organic components from the dispersing and/or coagulating agent are removed.

Figure 7:
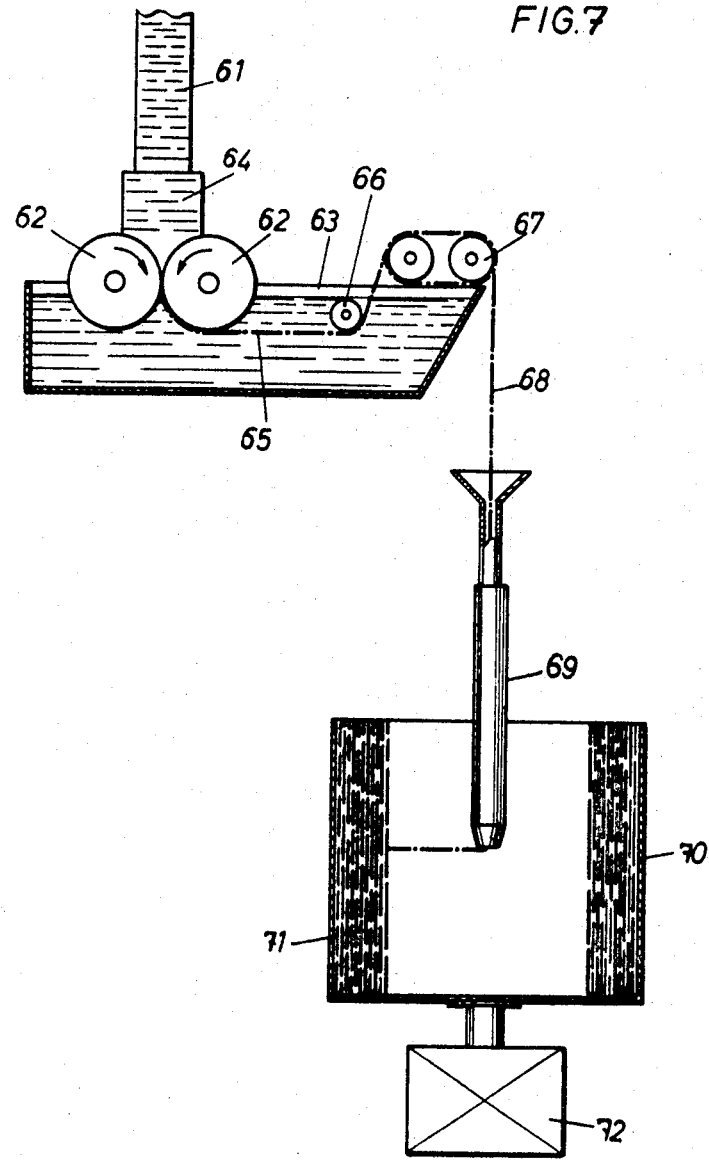

The apparatus according to the invention shown in FIG. 7 may operate, for example, with the same fiber dispersion as described above with reference to the embodiment shown in FIG. 1. The coagulating agent may also be the same, namly 50 grams of crystalline zinc sulfate per liter of water, for example. The apparatus comprises a supply and dispenser duct 61 filled with the dispersion 64. The bottom part of the dispenser forms a shaft terminating in a cusp-shaped slit nozzle formed between the top parts of two parallel and oppositely rotating drums 62 serving also as carrier structures. At the end faces of the drums 62 the wall of the dispenser extends downwardly as far as the level of the coagulating agent in container 63. Those wall parts of the dispenser 61 that terminate at the cylindrical surfaces of the respective drums 62 are provided with suitable seals which contact the drums so that when the drums 62 rotate as indicated by arrows, no dispersion can escape between the drums and the walls. The cylindrical surfaces of the drums have peripheral grooves.

When the apparatus is in operation, the conjointly rotating drums 62 issue between each other a flat band of dispersion into the coagulating agent in container 63. This band 65, immediately coagulating and solidifying, passes about a guide roller 66 and through a stretching mechanism 67, which it leaves as a band 68 to pass downwardly through a funnel-shaped guide 69 reciprocating vertically inside a spinning pot 70 driven by a motor 72. In accordance with the centrifugal spinning principle, the band is thus spun, and the resulting yarn is deposited to form a yarn cake 71 in the pot.

A preferred example of numerical data applying to the method and apparatus described with reference to FIG. 7 will be given presently.

The gap between the two drums 62 is preferably 0.08 mm. for a drum peripheral speed of 28 m. per minute. The spinning pot 70 may be of conventional design and rotate at a speed of 3000 r.p.m. With this pot speed and a delivery speed of 28 m. per minute, the yarn is twisted 100 times per running meter.

Suitable and preferred dimensions of the spinning pot are as follows:

Diameter—250 mm.
Height—185 mm.
Capacity—2.5 kg. of dry yarn with a count of 900 tex.

Figure 8:
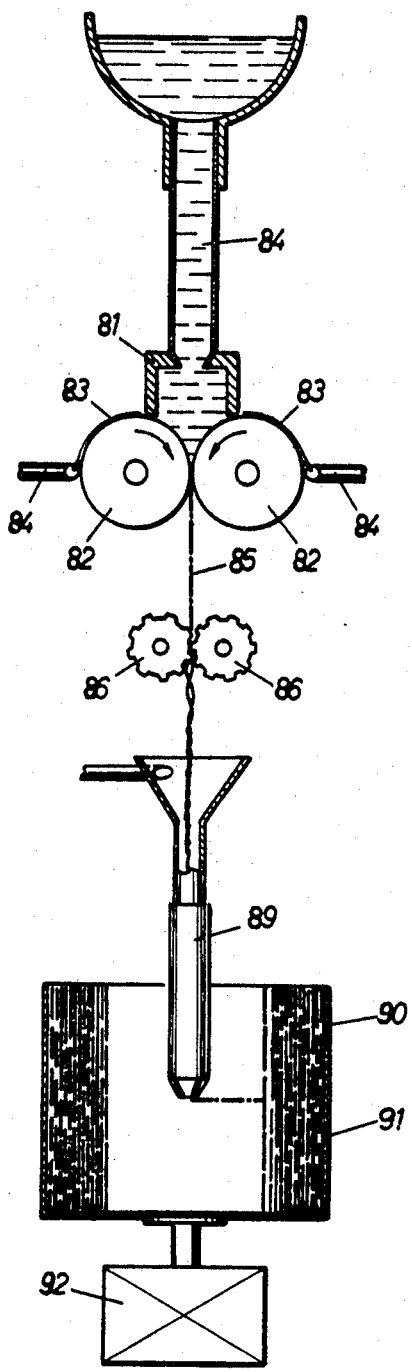

The apparatus shown in FIG. 8 can also be used with the above-described dispersing and coagulating agents. The asbestos fiber dispersion is supplied through a duct 84 and a dispenser 81 to two carrier drums 82 forming a gap of 0.06 mm. width between each other. Coagulating agent 83 is supplied by a jet nozzle system 84 to the drum cylindrical surfaces on which the agent forms a thin layer. The rotation of the drums 82 carries this layer into the bottom portion of the dispenser 81. Not later than when arriving in the cusp-shaped nozzle passage formed between the drums, the two thin layers of coagulating agent have solidified between each other the thin layer of dispersion medium to such an extent that the dispersion layer emerges as a band 85 out of the gap between the drums. The peripheral speed of the drums is 30 m. per minute. Their surfaces are grooved.

From the drums, the band passes to a pair of drafting or stretching rollers which have interengaging grooves parallel to their axes. The band is forced into the grooves of each roller 86 by the bands of the other roller. The peripheral speed of the roller is between 32 and 33 m. per minute.

A vertically reciprocating yarn guide 89 passes the band, then being twisted to yarn, into the spinning pot 90 where the asbestos yarn is deposited in layers 91. The pot is driven at 3000 r.p.m. by a motor 92. With a delivery speed of 30 m. per minute, this pot speed provides for 100 turns per meter of yarn.

In apparatus of the type shown in FIGS. 7 and 8, the carrier bodies 62 or 82 are preferably provided with grooves in their peripheral surfaces. These grooves continuously entrain coagulating agent from the bath to be pressed into the cusp-shaped nozzle passage between the carrier bodies. The grooves may extend in the peripheral direction or parallel to the axis of rotation. Intersecting grooves are also applicable. Such grooves substantially increase the surface area of the fiber strand since they provide it with projections and recesses. Consequently, the wetting of the fiber strand by coagulating solution is particularly intensive before the strand emerges from the nozzle opening and the inhibition of the dispersing properties of the dispersing agent is thorough. A further advantage of grooving the surface of the carrier body is that the band-shaped strand is not smooth but assumes the shape of a grooved fibrous structure whose individual fibers or groups of fibers can move more easily relative to each other during the following spinning operation. In consequence the spinning can be carried out in almost the same manner as for conventional textile fibers. The solidification of the emerging fibrous strand can be made more thorough by passing the strand repeatedly through the bath of coagulating agent.

A method which has been found particularly satisfactory for augmenting the action of the coagulating or precipitating agent lies in applying a stretching treatment to the strand, such as by the stretching devices 67 and 86 described above with reference to FIGS. 7 and 8. The stretching treatment promotes penetration of the agent into the interior of the strand or band. Preferably, the stretching means comprise at least two rollers rotating at different speeds. If only two rollers are used, care must be taken to have the fiber strand wrapped sufficiently about each roller to ensure an effective engagement, unless a meshing-type engagement (FIG. 8) is applied.

Another way of stretching the band is by means of two pairs of rollers of which one pair rotates at a higher speed than the other, the fiber strand being successively engaged between the rollers of the slower pair and then between those of the faster pair.

In apparatus with more than one carrier body it is preferable to have these carrier bodies dip so deeply into a bath of coagulating agent that, as shown in FIG. 7, the axes of their functional surfaces which correspond to their axes of rotation are located slightly above the level of the bath.

Various modifications may be made in the apparatus in accordance with the invention. For example, in the apparatus shown in FIG. 2 the breadth and length of the nozzle cross section may be varied by the provision of suitable means. In the apparatus of FIG. 1, a porous drum with means for supplying coagulating agent into it so that the agent flows through the drum peripheral wall and wets its surface may be provided instead of the drum 6 dipping into the coagulating agent. As a further modification given by way of example, a stretching device of the type shown in FIG. 7 or FIG. 8 is also applicable upstream from the funnel 14 in apparatus according to FIG. 1.

The strength, elasticity and other properties of products, particularly yarn, made according to the invention can be further improved by forming and coagulating the fiber dispersion as a coherent multi-filamentary strand, rather than as a plain band, prior to twisting it to a yarn. This will be more fully explained presently.

The methods according to the invention, if carried out as described above, have in common that the amount of dispersion coagulating in contact with a solid surface, and preferably also passing through a coagulant bath, before being twisted to a yarn, constitutes a paper-like band or tape in which the individual fibers adhere to each other, this being schematically represented by a portion of such a band shown in FIG. 9. Aside from the mutual adhesion of the fibers in the longitudinal direction of the band, they also stick together transversely, this being schematically represented by transverse double-headed arrows entered in FIG. 10 between the diagrammatically illustrated fibers presumed to be located within a band-like structure as shown in FIG. 9. Due to the mutual like adherence of the fibers, the shaped band structures inherently possess appreciable mechanical strength, which, in a yarn of 500 tex and a band of about 50 mm. width, is about 300 to 400 g. This strength, however, is not satisfactory for some further fabricating processes, such as certain weaving or braiding operations requiring a higher tear strength than heretofore attained with such asbestos products. Twisting the band increases the mechanical strength since the individual fibers become pressed together by the twisting operation. The peculiar texture of the band, however, does not permit attaining optimal strength values, and the elongation of such products remains inferior to that of conventional textiles. This is because the fibers along the longitudinal edges of the product, being strongly embedded in the band, become greatly over-elongated by the twisting process. This will be understood from FIG. 11 showing schematically a band according to FIG. 9 during twisting. It will be seen that the fiber or series of fibers located on the neutral axis A are not elongated by twisting, whereas the edge fibers at B or C are greatly stretched. The resulting prestress in the zones spaced from the neutral axis renders the product susceptible to notching, which manifests itself by the fact that, when yarn made of such twisted strands is being tested for knotting strength, the yarn will generally rupture at the knots.

We have found that in the respects just mentioned, the products made according to the present invention are greatly improved if care is taken to have the coagulating or coagulated strands converted into a structure composed of a multitude of longitudinally parallel and mutually adhering filamentary components, this being schematically represented in FIG. 12.

There are several ways, according to the invention, of achieving such a subdivision either mechanically or chemically or by combined mechanical and chemical processing. Suitable for the production of such multi-filamentary products, for example, is equipment as described above with reference to FIGS. 1 through 8 if a comb-like divider is placed immediately following the rotating drum or is located adjacent to the outlet of the nozzle from which the dispersion is issued. However, we have found that superior results are obtained by employing in a system of the type shown in FIGS. 7 and 8 a subdivided slit nozzle formed of two rotating and generally cylindrical rollers or drum members whose respective generatrix contours are serrated or corrugated and intermesh, the serrated contour lines of the two rotatable nozzle members being shaped differently so that there remains between the two members a multitude of interstitial orifices which are separated from each other, although the separation need not be complete. An embodiment of such a roller-type multi-filament nozzle is illustrated in FIG. 14, it being understood that it may be employed instead of the rotating member 62 in a system according to FIG. 7, or instead of the rotating members 82 in a system as shown in FIG. 8.

As will be seen from FIG. 14, the two roller members, here denoted by 94 and 95 have respective serrated generatrix contours 96 and 97. The serrations of the two roller or drum members have the same width of their individual teeth and are in meshing engagement with each other. The peaks of the serrations 97 touch or substantially engage the valleys of the serrations 96. However, the tooth height of the serrations 96 is somewhat smaller than that of the serrations 97. As a result, a multitude of individual interstitial nozzle gaps 98 is formed between the two members 94 and 95, the gaps being fully or largely separated from each other by the configuration of the intermeshing serrations.

While in the illustrated embodiment the individual nozzle gaps 98 have a generally triangular or arrowhead shape, they may also be given a rounded or other configuration as long as they remain suitable for producing a large number, preferably at least 40, filamentary strains of dispersion which combine into a single but discernibly subdivided band. The total width of the 40 or more interstitial gaps may be 50 mm., for example, although the width may be chosen within wide limits, for example between about 20 mm. and about 70 mm. In any case the height of the individual nozzle gaps should be such that each of the individual strains can coagulate throughout. For that reason, the height of the gaps and strains should not be larger than 0.5 mm.

By virtue of the peripheral grooves constituted by the serrated contours, a still better orientation of the fibers in the longitudinal direction within the individual strains of the yarn is obtained, so that the resulting tape or multi-filamentary structure possesses inherently a higher mechanical strength than a paperlike tape. During the following spinning process, the individual filaments group themselves centrally about the center axis. This results in a more perfectly rounded and better flaccid yarn. For these reasons, each individual band should be subdivided into approximately 40 individual filamentary components, as is the case with the multi-filamentary yarn produced for the purpose of the test reported presently.

The following test offers a comparison of coagulated bands with and without multi-filamentary structure. The bands were twisted to yarn under the same conditions as follows:

Rate of delivery: $L=20$ m./min.
Spinning-pot speed: $N=3000$ r.p.m.
This results in 150 rotations per meter of yarn length.

The following technological properties were measured:

|  | 400 tex yarn | |
| --- | --- | --- |
|  | Band shape | 40 filaments |
| Diameter (mm.) | 1.0 | 1.2 |
| Specific gravity | 0.51 | 0.38 |
| Strength (kg.) | 2.0 | 3.6 |
| Elongation (percent) | 1 | 6 |
| Knot strength ratio | 0.6 | 0.95 |

Figure 13:
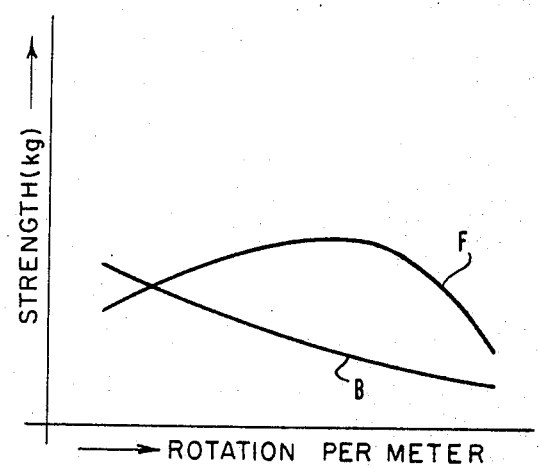

As will be seen from the tabulation, the strength and the elongation of the yarn product made with the aid of the multi-filament nozzles are considerably more favorable. This is of decisive importance for the further fabrication. The improvement becomes even more conspicuous if the yarn is spun at different numbers of rotations per meter. Thus, the graph shown in FIG. 13 represents the mechanical strength (in Kg.) versus rotations per meter of a multi-filament product represented by curve F and of a plain band-type product represented by the curve B. While the strength of the plain product B decreases with increasing rotation per meter, the multi-filament product increases its strength up to an optimum whereafter the strength also decreases. The elasticity of the yarn is about 3 to 4% as compared with 1 to 2% of yarn made from plain tape under otherwise the same conditions.

Another way according to the invention of producing multi-filamentary products is to take care that the shaping of the band structure, for example with any of the devices described above with reference to FIGS. 1 to 8, results in a longitudinal strength of considerably higher value than transverse strength of the band. This can be done by applying a correspondingly high issuing speed of the material from the hopper onto the drum (FIG. 1), or a particularly high speed of ejecting the material through the slit nozzles according to FIGS. 7 or 8. As a result of such a high speed of travel, the distribution of tension in the band is oriented and results in a correspondingly oriented strength. The transverse strength of the band, being rather slight, can then be reduced or obviated by mechanical or chemical means or both in order to obtain a multi-filamentary band as described in the foregoing. The mechanical separation of the individual filaments is effected preferably by passing the band over a transversely bulging structure, such as the one exemplified in FIGS. 15 and 16 and described hereinafter. For a chemical dissolution into a multitude of filaments, the bonding agent between the individual strains of filaments can be subjected to a short-lasting chemical reaction with a solvent, such as a suitable acid or the like. A preferred way of performing such a reaction treatment is to inject onto the band a hot solution of caustic soda, weak acid or other substances that again peptize the precipitated zinc stearate, thus reconverting it to a soluble soap. The improvements thus obtained are similar to those described above.

Figure 15:
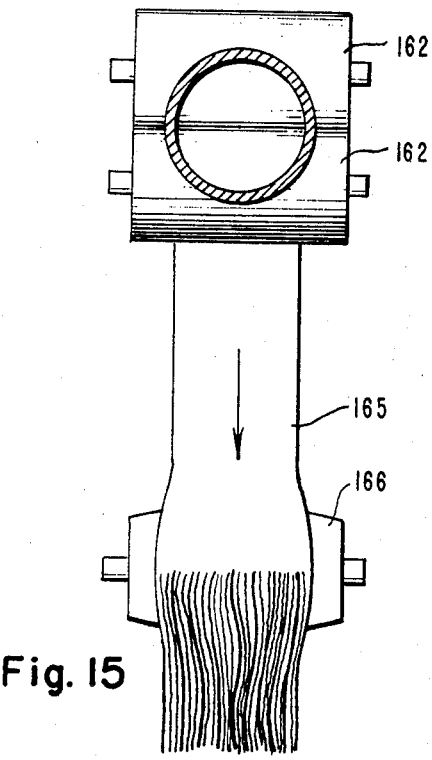
FIGS. 15 and 16 illustrate schematically two other embodiments of apparatus for producing multi-filamentary strands according to the invention.

The embodiment shown in FIG. 15 corresponds to any one of those described with reference to FIGS. 1 to 8. The two drum or roller members of the slit nozzle in FIG. 15 are denoted by 162 and the band structure issuing from between these members is denoted by 165. The band passes over another roller member 166 which may be situated, for example, at the locality of roller 166 in FIG. 7 and, aside from having the above-described purpose of roller 166, serves also to transversely stress the band 165 so as to tear the rather weak bonds between the filaments. For this purpose, the roller 166 is given the bulging barrel shape apparent from FIG. 15. The subsequent spinning of the now substantially subdivided tape structure is effected in the manner and by the means described with reference to FIG. 7.

Figure 16:
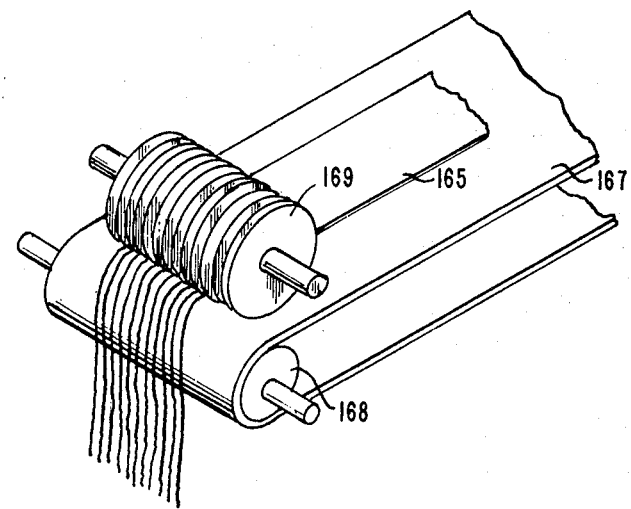

The device shown in FIG. 16 is applicable with any of the band-forming apparatus according to FIGS. 1 to 8. The band structure 165, upon sufficient coagulation, is conveyed on an endless belt 167 over a turn-around roller 168 which places the band under the tension required for a rotating multi-blade cutter 169 to slice the band into fine filaments. These are twisted together by the following spinning process.

To those skilled in the art, it will be obvious from a study of this disclosure that our invention permits of various other modifications and may be given embodiments different from those illustrated and described herein, without departing from the essential features of our invention.

We claim:
1. The method of producing asbestos strand material which comprises the steps of preparing a film-forming dispersion of asbestos fibers in dispersant-containing water, shaping the dispersion to a travelling stand of transversely elongated shape by dispensing the dispersion through an elongated slit-shaped nozzle gap between two nozzle members of which at least one is cylindrical and rotatable about its axis, the gap having dimensions substantially equal to the cross-sectional width and thickness of the strand and being too narrow to dispense the strand when said cylindrical member stands still, maintaining the cylindrical member in rotation about its axis and thereby dispensing and shaping the strand, wetting the peripheral surface of the rotatable member by coagulant ahead of the gap relative to the direction of rotation, passing the strand through a coagulant bath, and twisting the coagulated strand to yarn during its further travel.

2. Apparatus for producing asbestos strand material, comprising dispenser duct means for supplying an aqueous dispersion of fibrous asbestos, a strand-shaping nozzle device having two members spaced from each other and forming between each other an elongated slit-shaped nozzle gap at the dispensing end of said duct means for issuing through said gap a strand of dispersion, at least one of said two members being cylindrical and rotatable about its cylinder axis, said axis extending parallel to said slit-shaped gap and said gap being sufficiently narrow to issue the dispersion only when said cylindrical member is in rotation about said axis, and coagulant applicator means in proximity to the peripheral surface of said rotatable member outside of said dispenser duct means for wetting said peripheral surface by coagulant ahead of said gap relative to the direction of rotation, whereby the issuing strand is solidified by coagulation.

3. In apparatus according to claim 2, said other member of said nozzle device forming the bottom portion of said dispenser duct means and having the shape of a hopper tapering downwardly toward and along said rotatable member; said coagulant applicator means comprising a container filled, when in operation, with a bath of coagulant liquid up to a given level; and said rotatable member being partly situated in said container below said level so as to be wetted by immersion to the coagulant.

4. Apparatus according to claim 2 comprising adjusting means for varying at least one of the width and length dimensions of said gap, whereby the cross-sectional shape and size of the issuing strand is correspondingly adjustable.

5. In apparatus according to claim 2, said nozzle device being also rotatable about a twist axis normal to said cylinder axis, the peripheral wall of said cylindrical member being porous, and said coagulant applicator means comprising duct means for supplying coagulating agent into the interior of said cylindrical member.

6. In apparatus according to claim 5, said cylinder axis being horizontal and said twist axis being vertical.

7. Apparatus according to claim 5, comprising means for guiding the twisted strand away from the carrier body along said twist axis.

8. In apparatus according to claim 5, said nozzle gap being symmetrical to said twist axis, and said supply duct having a portion extending on the twist axis where said portion is joined with said nozzle device.

9. In apparatus according to claim 2, said strand-shaping nozzle device comprising two parallel cylindrical nozzle members spaced from each other and rotatable in opposing directions about respective axes transverse to the dispensing direction, said two cylindrical nozzle members forming between each other a cusp-shaped nozzle area which terminates said duct means and forms a nozzle orifice for issuing a strand of dispersion; and said coagulant applicator means comprising respective coagulant supply means in proximity to the peripheral surfaces of said two nozzle members for wetting said peripheral surfaces outside of said dispenser duct means by coagulant before said surfaces enter into said cusp-shaped area, whereby the issuing strand is solidified by coagulation on both said rotatable members.

10. In apparatus according to claim 9, said dispenser duct being downwardly directed, said two parallel cylindrical nozzle members being rotatable downwardly at their mutually adjacent sides, and said duct means being downwardly terminated by said cusp-shaped nozzle area.

11. In apparatus according to claim 10, said coagulant applicator means comprising a container filled, when in operation, with a bath of coagulant liquid up to a given level; said two rotatable nozzle members being partly situated in said container below said level to be wetted by immersion in the coagulant liquid, said slit-shaped nozzle gap being also located below said level for passing the issuing strand directly into the coagulant liquid.

12. In apparatus according to claim 9, said coagulant applicator means comprising jet nozzle means having respective jet orifices directed toward said respective peripheral surfaces of said two rotatable nozzle members.

13. Apparatus according to claim 2 comprising guiding means engageable with the strand for guiding it away from said nozzle device, strand twisting means downstream of said guiding means, and a stretching device engageable with the strand ahead of said twisting means.

14. In apparatus according to claim 9, said nozzle orifice having the shape of a slit whose long sides are formed by said two nozzle members and whose length and width are approximately equal to the cross-sectional width and thickness respectively of the solidified strand.

15. In apparatus according to claim 8, said peripheral surfaces of said rotatable nozzle members having peripheral grooves.

16. In apparatus according to claim 9, said nozzle orifice having the shape of a slit whose long sides are formed by said two nozzle members and whose length and width are approximately equal to the cross-sectional width and thickness respectively of the solidified strand, means for dividing said strand upon at least partial coagulation into a multitude of longitudinal filamentary components, and means for twisting said multi-filament strand to convert it to yarn.

17. In apparatus according to claim 9, said rotatable nozzle members having each a serrated generatrix contour intermeshing with that of the other member so as to form between said contours a multitude of nozzle orifices mutually separated substantially by the serrations of said members, whereby the strand issuing from said nozzle is composed of a multitude of filamentary components.

18. In apparatus according to claim 17, said serrations of one of said rotatable nozzle members having peaks substantially touching the serration valleys of the other member, and said serrations of said other member having peaks radially spaced from the serration valleys of said one member.

19. Apparatus according to claim 2, comprising a roller of bulging barrel shape having its axis extend transverse to the strand travel direction, said roller being situated behind said coagulant applicator means relative to said direction and being engageable by the band so as to transversely stretch the band for subdividing it into longitudinal filaments as the band travels past said roller.

20. Apparatus according to claim 2, comprising a multi-blade cutting device situated behind said coagulant applicator means relative to the strand travel direction and being engageable with the strand for subdividing it into longitudinal filaments.

21. An asbestos fiber product formed by the method according to claim 1.

References Cited

UNITED STATES PATENTS

| | | | |
|---|---|---|---|
| 2,269,563 | 1/1942 | Taylor et al. | 19—66 XR |
| 2,698,972 | 1/1955 | Keeler. | |
| 2,743,573 | 5/1956 | Hiensch | 57—35 XR |
| 2,780,909 | 2/1957 | Bielfeld et al. | 57—164 |
| 2,817,947 | 12/1957 | Strang. | |

FOREIGN PATENTS 936,628  11/1963  Great Britain.

MERVIN STEIN, Primary Examiner

W. H. SCHROEDER, Assistant Examiner

U.S. Cl. X.R.

57—35, 153, 164